United States Patent
Potter

(10) Patent No.: US 11,242,971 B2
(45) Date of Patent: Feb. 8, 2022

(54) REFLECTOR FOR A SUPPLEMENTARY BEAM

(71) Applicant: VALEO NORTH AMERICA, INC., Troy, MI (US)

(72) Inventor: Brant Potter, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 16/730,807

(22) Filed: Dec. 30, 2019

(65) Prior Publication Data
US 2021/0199259 A1 Jul. 1, 2021

(51) Int. Cl.
| | |
|---|---|
| *F21S 41/33* | (2018.01) |
| *F21S 41/32* | (2018.01) |
| *B60Q 1/06* | (2006.01) |
| *F21S 41/141* | (2018.01) |
| *F21Y 115/10* | (2016.01) |

(52) U.S. Cl.
CPC .............. *F21S 41/323* (2018.01); *B60Q 1/06* (2013.01); *F21S 41/141* (2018.01); *F21S 41/337* (2018.01); *F21Y 2115/10* (2016.08)

(58) Field of Classification Search
CPC .......................... F21S 41/33–338; F21S 41/323
See application file for complete search history.

(56) References Cited

U.S. PATENT DOCUMENTS

| | | | |
|---|---|---|---|
| 10,100,993 B2 | 10/2018 | Yamamoto | |
| 10,234,094 B2 | 3/2019 | Orisich et al. | |
| 2004/0240223 A1* | 12/2004 | Brun | F21S 41/17 362/517 |
| 2016/0084465 A1* | 3/2016 | Yamamoto | F21S 41/148 362/517 |

FOREIGN PATENT DOCUMENTS

| | | |
|---|---|---|
| EP | 1970618 A1 | 9/2008 |
| JP | 2014229588 A | 12/2014 |
| KR | 20150072086 A | 6/2015 |

* cited by examiner

*Primary Examiner* — Sean P Gramling
(74) *Attorney, Agent, or Firm* — Valeo North America, Inc.

(57) ABSTRACT

A vehicle headlamp assembly, a reflector for the headlamp assembly, and a method for generating a supplementary beam using the reflector are provided. The vehicle headlamp assembly includes a light source and a reflector. The reflector includes a plurality of facets. Each facet of the plurality of facets is configured to contribute to a section of a beam pattern of a light beam of the headlamp assembly by reflecting light emitted by the light source.

19 Claims, 16 Drawing Sheets

FIG. 12

REFLECTOR FOR A SUPPLEMENTARY BEAM

BACKGROUND

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions. Numerous studies have found that nighttime visibility is a key to highway safety.

In an effort to improve vehicle and pedestrian safety, most governments promulgate some form of safety regulations that specify motor vehicle lighting performance requirements. This helps to ensure adequate illumination of the roadway and enhance the visibility of motor vehicles on the roads so that their presence is perceived and their signals are understood in daylight, in darkness, and in conditions of reduced visibility.

In addition, in North America, the Insurance Institute for Highway Safety (IIHS) testing has become very important. Customers often require a IIHS rating of 'Good'. Current bi-function modules typically do not have an IIHS rating of 'Good'. Often the performance of the high beam (HB) is not sufficient to achieve the IIHS rating of 'Good'. A possible solution is to add a supplementary low beam (LB) or HB.

What is needed as recognized by the present inventor is a supplementary module that increase illumination on IIHS HB targets (to reduce demerits) without exceeding regulatory limits, such as SAE (Society of Automotive Engineers) H-V limits of 75,000 candelas.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

In one aspect, the present disclosure relates to a headlamp assembly for automotive lighting including a light source and a reflector. The reflector includes a plurality of facets. Each facet of the plurality of facets is configured to contribute to a section of a beam pattern of a light beam of the headlamp assembly by reflecting light emitted by the light source.

In one aspect, the beam pattern associated with the reflector has a V-shape.

In one aspect, the V-shape is around a predefined point in the beam pattern.

In one aspect, the light source is imaged at a bottom of the V-shape below the predefined point.

In one aspect, the light source module includes a plurality of light-emitting diode (LED) components.

In one aspect, a center facet of the plurality of facets includes a first center facet and a second center facet, the first center facet and the second center facet being angled with respect to each other.

In one aspect, the center facet of the plurality of sectors is associated with a central section of the luminous intensity distribution.

In one aspect, the light source is positioned proximate to the center facet.

In one aspect, the headlamp assembly also includes a bi-function module configured to generate a high beam and a low beam, wherein the beam pattern from the reflector is superimposed with the high beam or the low beam.

In one aspect, the reflector includes six facets.

In one aspect, a first facet and a second facet contribute to mirror sections of the beam pattern and a third facet and a fourth facet contributes to other mirror sections of the beam pattern.

In one aspect, each facet of the plurality of facets has a parabolic shape.

In one aspect, each facet of the plurality of facets is angled with respect to each other.

In one aspect, a profile of the reflector is a function of locations of predetermined target points.

In one aspect, the profile of the reflector is configured to increase illumination at the predetermined target points.

In one aspect, the present disclosure relates to a reflector for a vehicle headlamp. The reflector includes a plurality of facets. Each facet of the plurality of facets is configured to contribute to a section of a beam pattern of a light beam by reflecting light emitted by a light source.

In one aspect, the present disclosure relates to a method of generating a supplementary light beam. The method includes emitting a first luminous intensity distribution via a first facet of a reflector including a plurality of facets; and emitting a second luminous intensity distribution via a second facet of the reflector. The first luminous intensity distribution and the second luminous intensity distribution increase illumination at predefined target points.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is an IIHS spreadsheet output in accordance with one example.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another. Described herein is a lighting module including a reflector that provides improved illumination on predefined targets (e.g., Insurance Institute for Highway Safety (IIHS) high beam (HB) targets (to reduce demerits)) and associated methodology. Further, the lighting module is easily aligned/registered to the low beam (LB) pattern and does not add additional light to the H-V point. The lighting module described herein has a unique cut-off step that allows the easier alignment to the LB pattern. The cut-off step is formed around the H-V.

Figure 1:
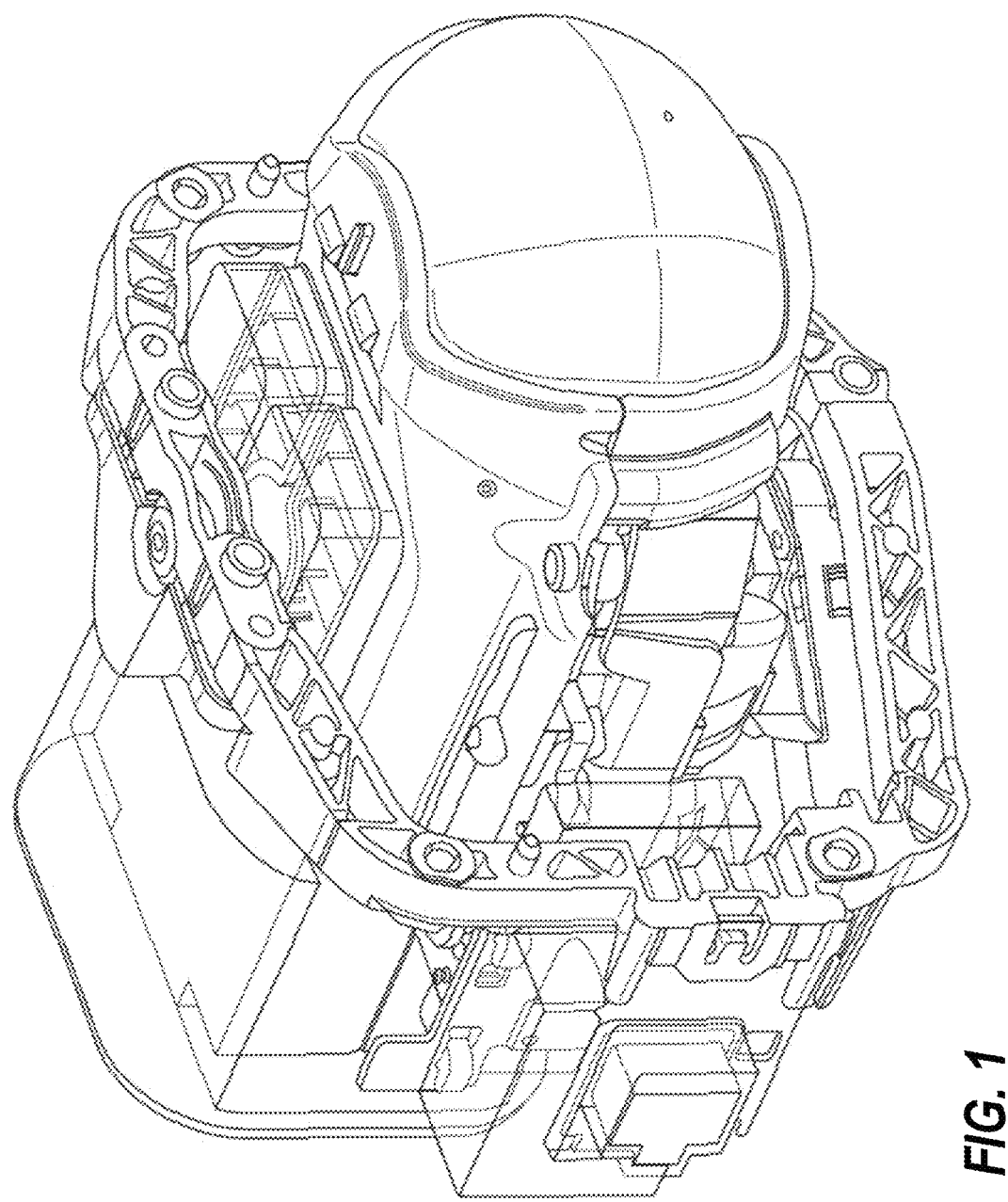
FIG. 1 is a schematic that shows a bi-function module according to one example.
Figure 2A:
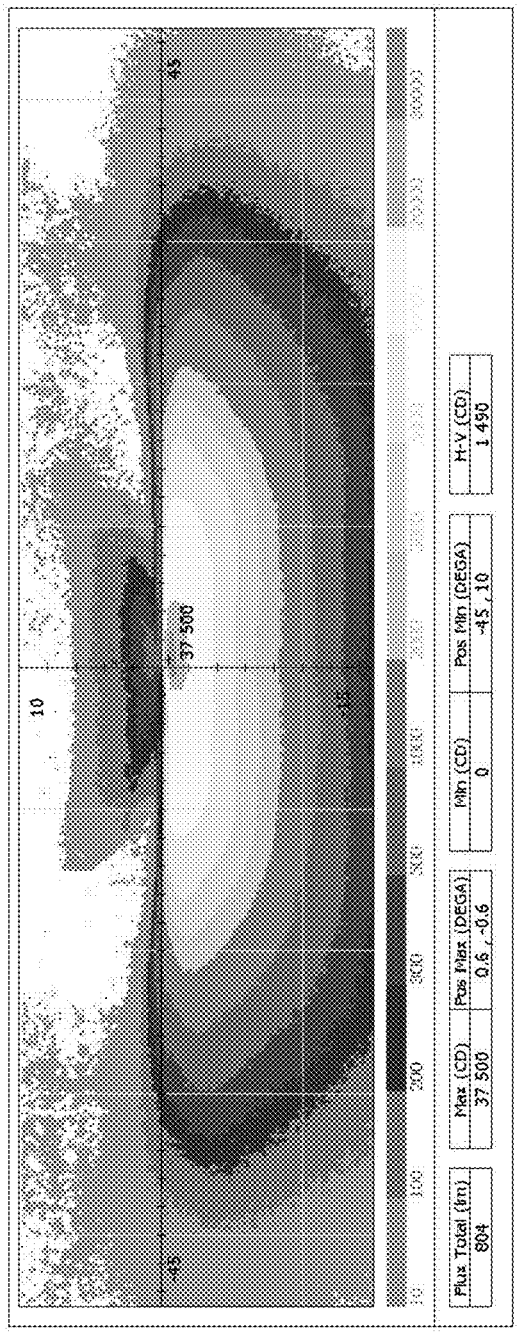
FIG. 2A is a schematic that shows an exemplary luminous distribution of a low beam according to one example.
Figure 2B:
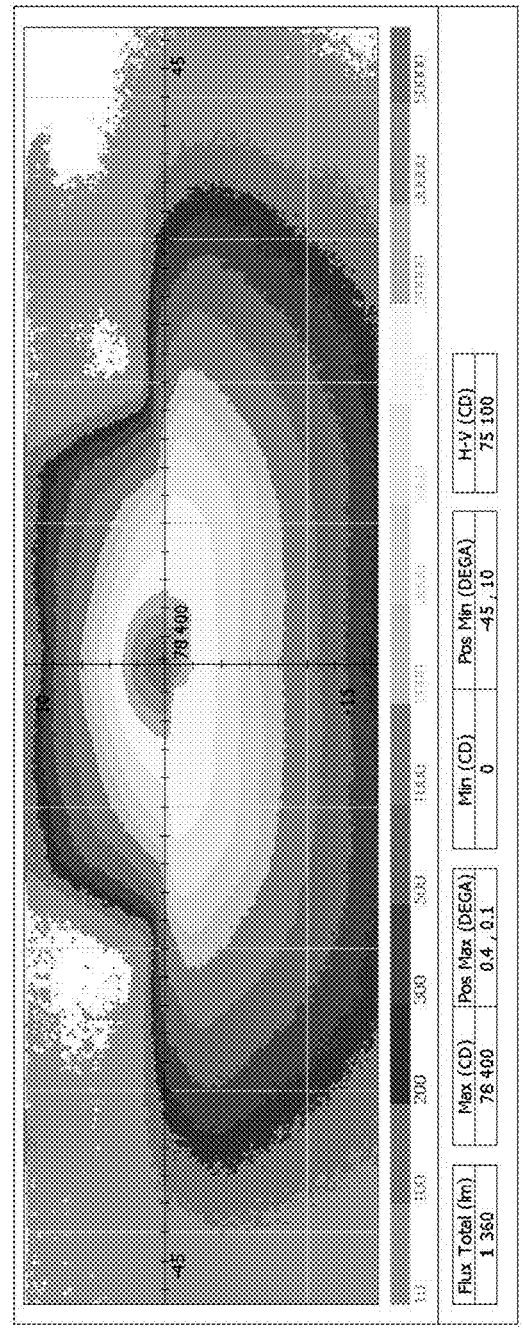
FIG. 2B is a schematic that shows an exemplary luminous distribution of a high beam according to one example.

FIG. 1 is a schematic that shows a bi-function module 100 according to one example. The bi-function module 100 is a bi-function projector that provides high and low beam lighting. The luminous intensity distribution of the low beam is shown in FIG. 2A and the luminous intensity distribution associated with the high beam is shown in FIG. 2B. In other examples, the low beam and the high beam may be generated by two separate lighting modules.

The luminous intensities shown in the figures are as seen or measured at a screen spaced from, and parallel to, the front (emitting) face of the headlamp. A horizontal axis H and vertical axis V are shown overlaid on luminous intensity distributions. The horizontal axis H and vertical axis V identify horizontal and vertical planes intersecting both the center of the headlamp and the screen. The vertical line V-V and the horizontal line H-H pass through a H-V point. The vertical line V-V and the horizontal line H-H are measured in degrees. The horizontal axis H and vertical axis V shown in FIGS. 2A and 2B include tick marks spaced at 2° intervals, with the major grid spaced at 10° intervals such that the horizontal extent is 45°

In FIG. 2A, the maximum intensity is located at a position of 0.6 degrees along the horizontal axis and −0.6 degrees along the vertical axis. The maximum intensity illustrated is 37500 candelas having a total lumen flux of 804. The intensity at the H-V point is 1490 candelas. The number at the bottom represents relative intensity in units of candelas (CDs).

In FIG. 2B, the maximum intensity is located at a position of 0.4 degrees along the horizontal axis and 0.1 degrees along the vertical axis. The maximum intensity illustrated is 78400 candelas having a total lumen flux of 1360. The intensity at the H-V point is 75100 candelas.

In some vehicle markets, consumer testing is done on headlamp to evaluate performance. For example, in the United States SAE market, IIHS testing is performed as described previously herein. It's important that the high beam and low beam are scored 'good'. A good score improves the overall safety rating for the vehicle and therefore is important to consumers. In the IIHS testing the lower (fewer) the demerits the better. For example, a score of 10 or less is considered 'good'.

The bi-function module 100 has a score of 8. The demerit is calculated using a standard methodology as would be understood by one of ordinary skill in the art. Although the score is less than 10, the score is not acceptable to the customers when considering tolerances and other factors in the vehicle lamp.

Figure 3:
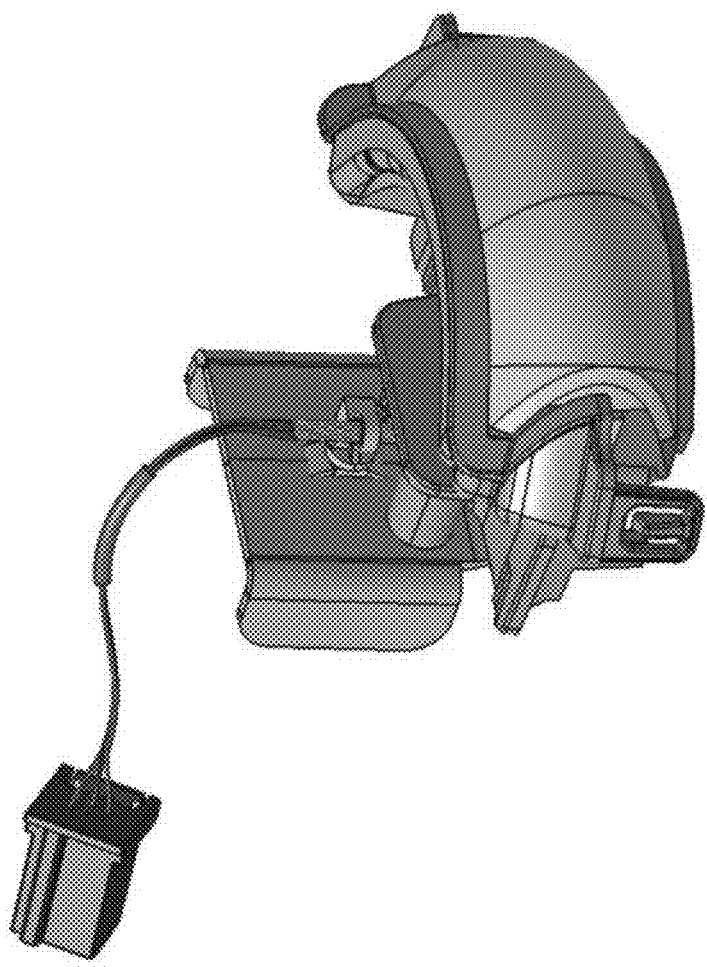
FIG. 3 is a schematic that shows a supplementary module according to one example.
Figure 4A:
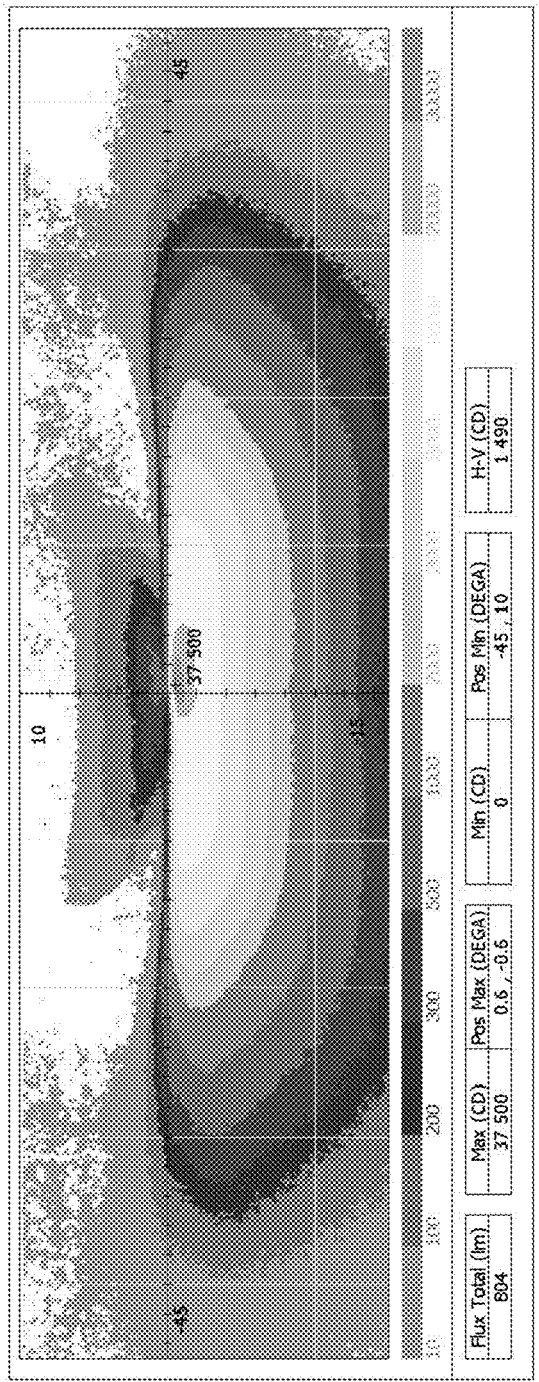
FIG. 4A is a schematic that shows an exemplary luminous distribution of a low beam of the bi-function module and the supplementary module according to one example.

An additional module may be added to the headlamp module. FIG. 3 shows a supplementary module 300. The luminous intensity distribution of the low beam generated by the bi-function module 100 and the supplementary module 300 is shown in FIG. 4A. The luminous intensity distribution associated with the high beam generated by the bi-function module 100 and the supplementary module 300 is shown in FIG. 4B.

In FIG. 4A, the maximum intensity is located at a position of 0.6 degrees along the horizontal axis and −0.6 degrees along the vertical axis. The maximum intensity illustrated is 37500 candelas having a total lumen flux of 804. The intensity at the H-V point is 1490 candelas.

Figure 4B:
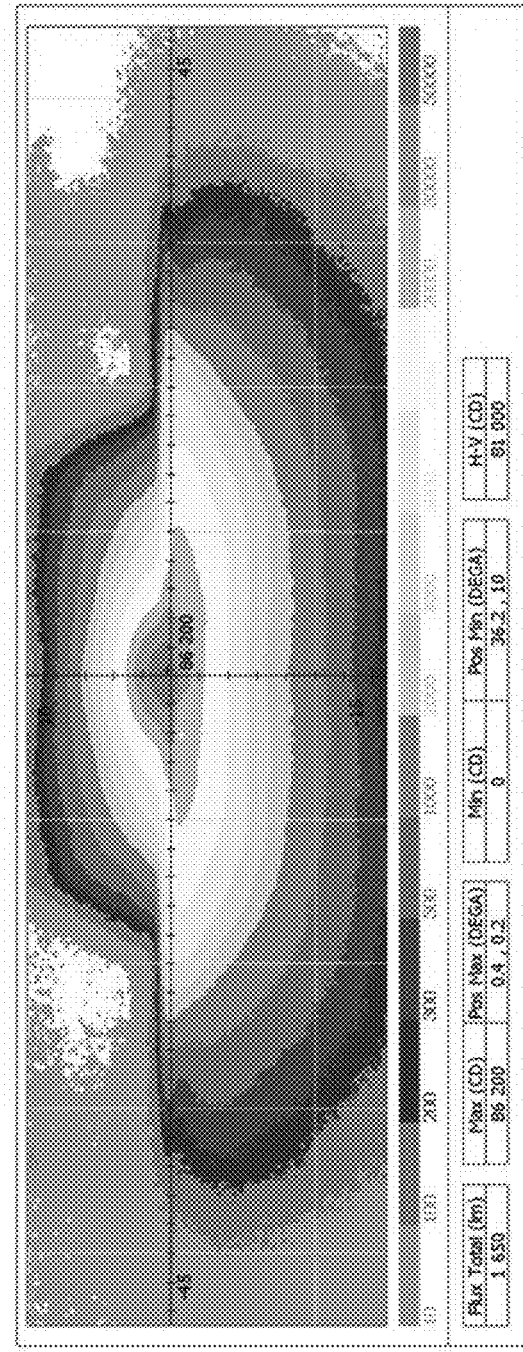
FIG. 4B is a schematic that shows an exemplary luminous distribution of a high beam of the bi-function module and the supplementary module according to one example.

In FIG. 4B, the maximum intensity is located at a position of 0.4 degrees along the horizontal axis and 0.2 degrees along the vertical axis. The maximum intensity illustrated is 86200 candelas having a total lumen flux of 1650. The intensity at the H-V point is 81000 candelas.

As shown in FIG. 4B, the high beam illumination is improved. A headlamp including the bi-function module 100 and the supplementary module 300 has a score of 5.

Figure 5:
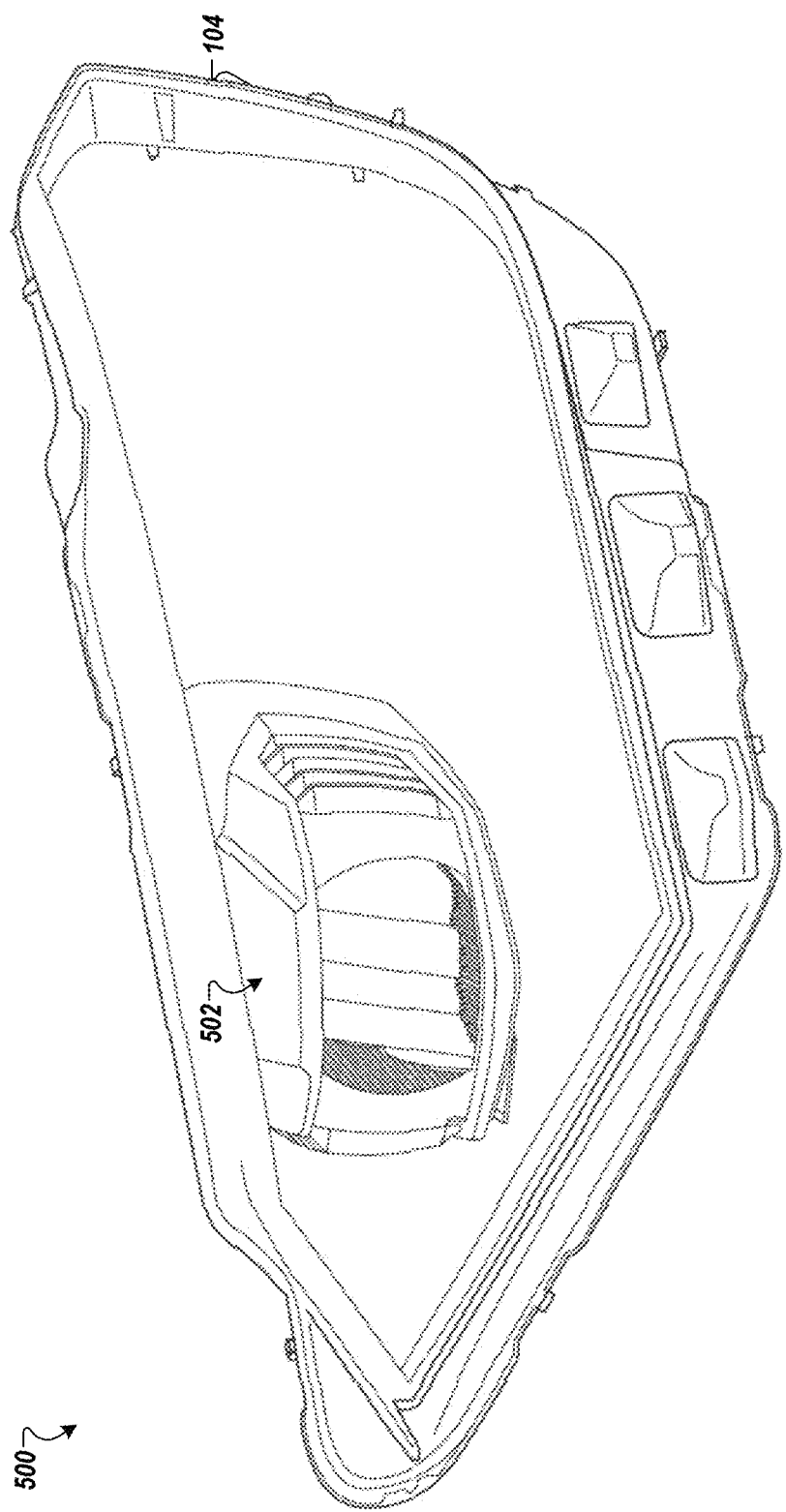
FIG. 5 is a schematic of a vehicle headlamp according to one example.
Figure 7:
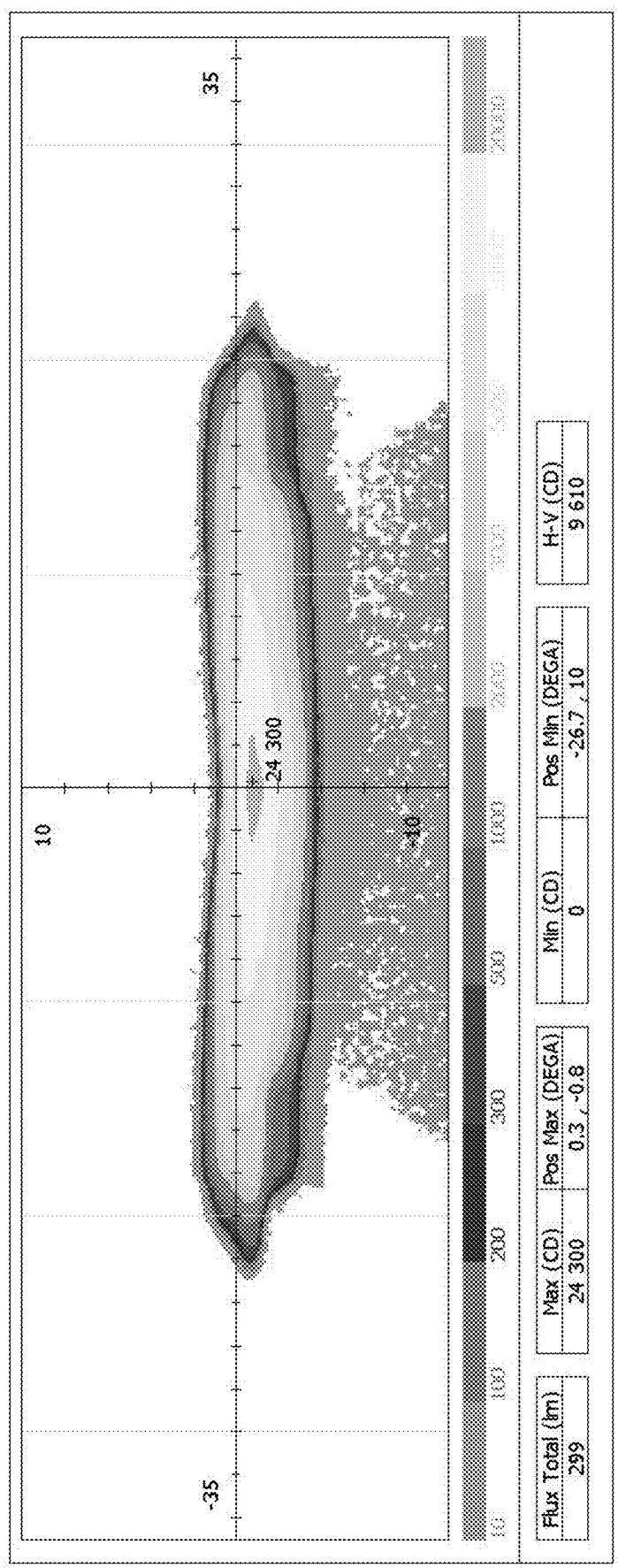
FIG. 7 is a schematic that shows an exemplary luminous distribution of the supplementary reflector according to one example.

FIG. 5 illustrates an exemplary vehicle headlamp 500 according to one example. The headlamp 100 includes a reflector 502 and the bi-function module 100. The vehicle headlamp is coupled to a power source. The power source may include a battery, alternator and/or other device for providing electrical power for electrical and electronic devices of the vehicle. The luminous intensity distribution associated with the reflector 502 is shown in FIG. 7. The reflector 502 adds the pattern shown in FIG. 7 to the high beam illumination. As shown in FIG. 7, the reflector 502 does not add light to the H-V point but add light to the IIHS targets.

In FIG. 7, the maximum intensity is located at a position of 0.3 degrees along the horizontal axis and −0.8 degrees along the vertical axis. The maximum intensity illustrated is 24300 candelas having a total lumen flux of 299. The intensity at the H-V point is 9610 candelas.

Figure 8:
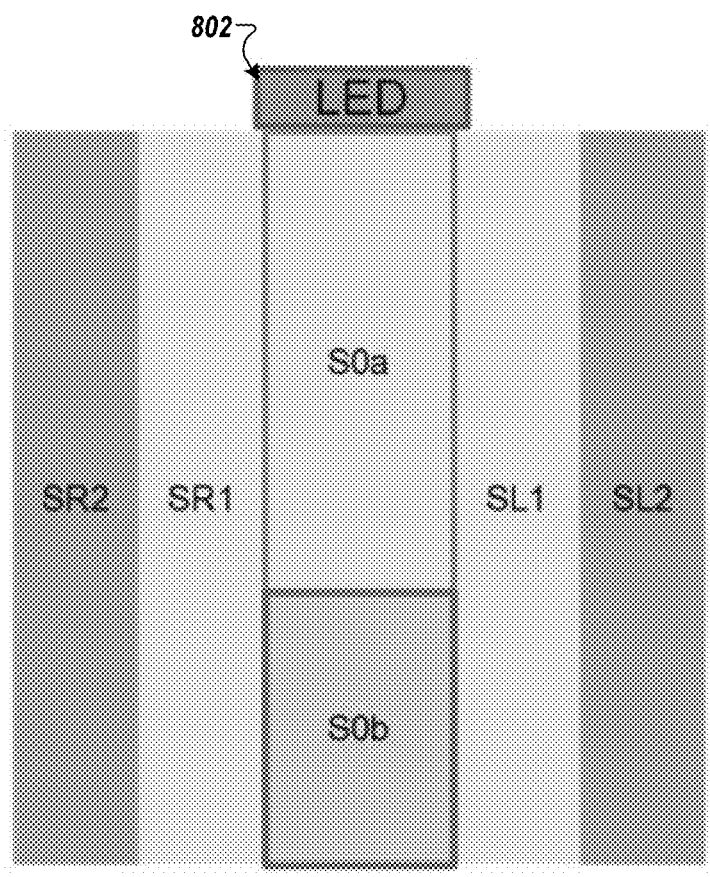
FIG. 8 is a schematic that shows a plurality of sectors of the supplementary reflector according to one example.

FIG. 8 is a schematic that shows a plurality of sectors of the supplementary reflector according to one example. The supplementary reflector 502 also includes a light source 802.

Figure 6A:
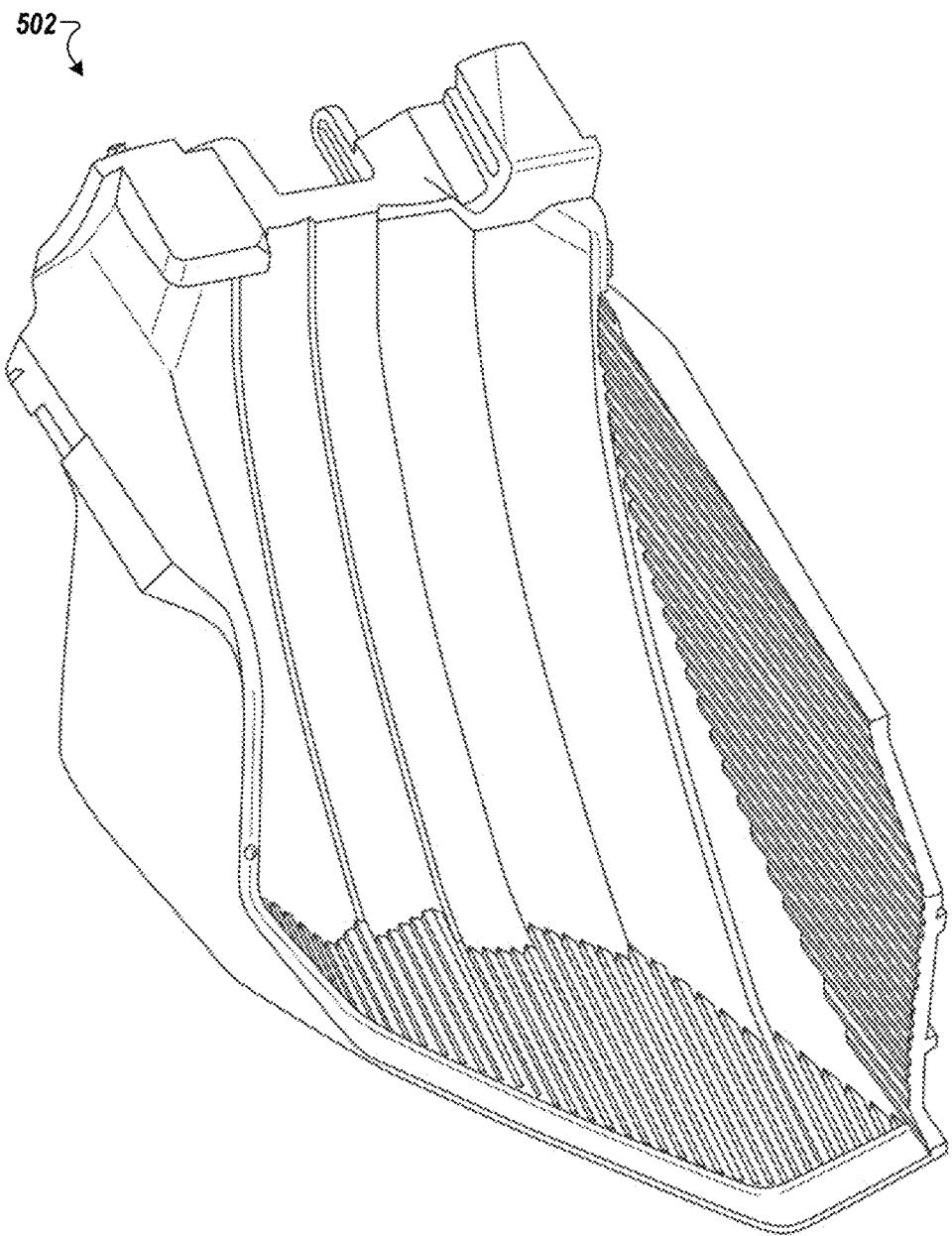
FIG. 6A is a schematic that shows a supplementary reflector according to one example.
Figure 6B:
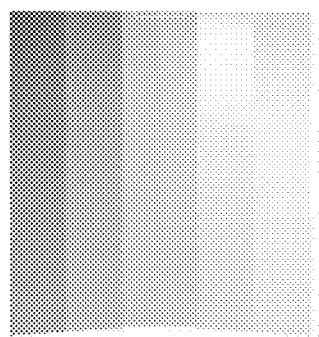
FIG. 6B is a schematic that shows a surface profile of the supplementary reflector according to one example.

FIG. 6A is a schematic that shows the reflector 502 according to one example. A surface profile of the reflector 502 is shown in FIG. 6B. The reflector includes multiple reflecting facets. Each facet is configured to reflect light from the light source 802. Each facet is angled with respect to another facet. In one example, the reflector 502 may include multiple facets in the horizontal direction. Further, a facet may be divided in the vertical direction. For example, the center facet may be divided into two or more facets. In FIG. 8, the center facet is divided into two facets. The two facets may be angled with respect to each other. The center facet may be proximate to the location of the light source 802. In one embodiment, the reflector 502 includes six facets: SR2, SR1, S0a, S0b, SL1, and SL2. Each facet is associated with a region of the luminous intensity distribution. Each facet is configured to provide desired a light pattern as described later herein.

The light source 802 can be a solid state light source such as a light emitting diode (LED), an organic light emitting diode (OLED), a polymer light emitting diode (PLED), and/or a monolithic LED, an electrical filament light source such as a halogen light source and/or an incandescent light source, a plasma light source such as a fluorescent light and/or any other type of light sources as would be understood by one of ordinary skill in the art. In one example, the light source 802 is a single light source. In one example, the light source 802 is a light emitting diode (LED). The light source 802 may also include multiple LEDs.

Each of the facets may have a parabolic shape. In addition, the facets can be coated with a metalized layer and/or polished metal, e.g., aluminum, aluminum alloy, or the like. The facets may be connected seamlessly and form a continuous surface. In one example, the facets may include discontinuities. For example, the facets may have a step profile. In other words, one or more of the facets may be raised with respect to each other. The facets have a reflectivity in the range of from 75-95%, with a typical value of about 85%.

Figure 9:
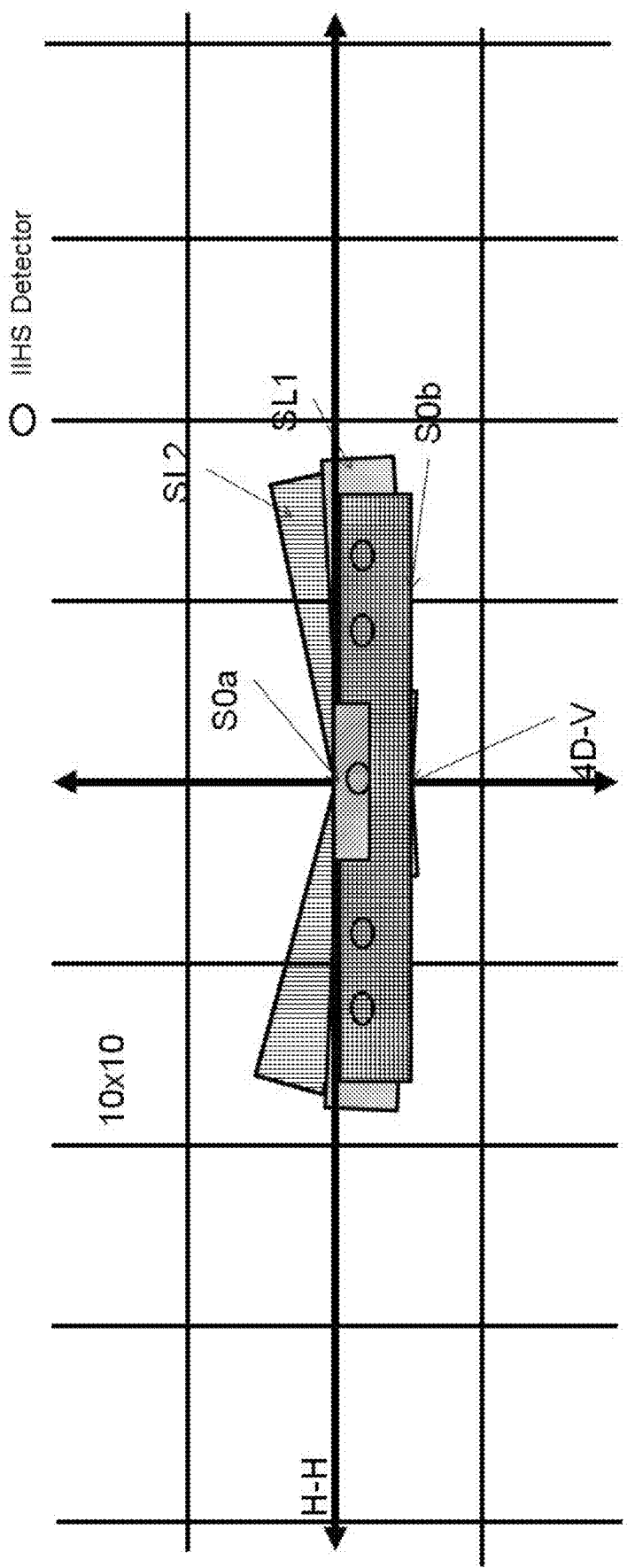
FIG. 9 is a schematic that shows the plurality of sectors of the distribution associated with each facet of the supplementary reflector according to one example.

FIG. 9 is a schematic that shows the multiple sectors of the distribution associated with each facet according to one example. Thus, each facet contribute to light (increase illumination) in the associated region (i.e., a different portion of the beam pattern). For example, a center facet contributes to light in the central region of the beam pattern. In one implementation, the sectors are mirrored with respect to the V-V line. For example, a first sector SL2 and a second sector SR2 are mirrored with respect to the V-V line.

IIHS detector locations or targets are indicated by 902 in FIG. 9. The detector locations correspond to various horizontal curvatures (straightaway, 150 m radius left and right curves, and 250 m radius left and right curves).

Figure 10A:
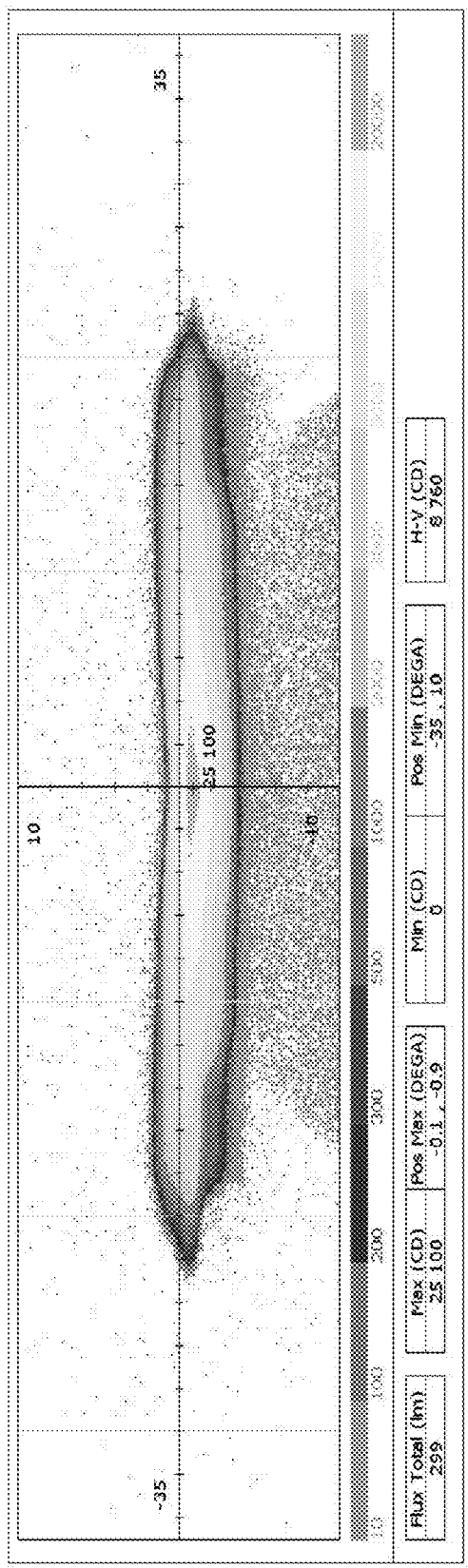
FIG. 10A is a schematic that illustrates an exemplary luminous intensity distribution of a supplementary beam according to one embodiment.

The beam pattern associated with all sectors or facets is shown in FIG. 10A. In FIG. 10A, the maximum intensity is located at a position of −0.1 degrees along the horizontal axis and −0.9 degrees along the vertical axis. The maximum intensity illustrated is 25100 candelas having a total lumen flux of 299. The intensity at the H-V point is 8760 candelas. The light source flux in this example is 600 lumens (299 lumens in the beam pattern, so Optical System Efficiency is ~50%, which includes the outer lens and reflectivity). FIG. 10A provides only one possible example. Typical values for such a system are:

Global Efficiency=0.40-0.55 (40-55%);
MIN Beam Flux>250;
Typical Beam Flux=250-350;
HV Intensity=3000-10000.

The typical beam flux this is highly dependent on the source used. Further, the HV intensity is an important attribution of the design because there is typically an H-V max of 75000cd, and the primary HB is typically at 55000-65000cd.

Figure 10B:
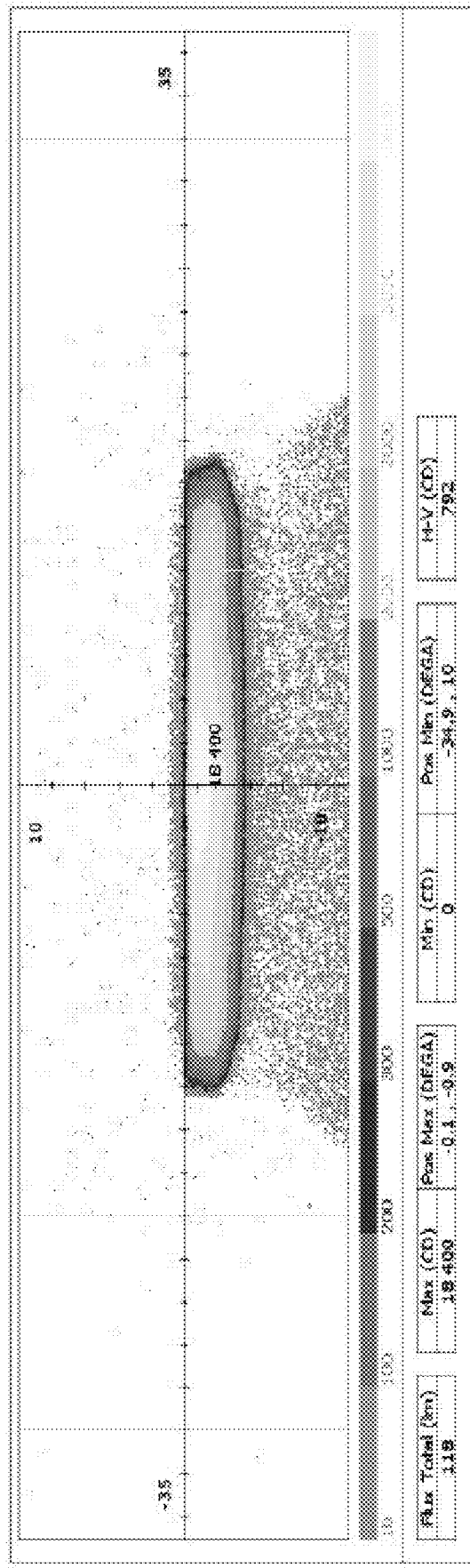
FIG. 10B is a schematic that illustrates a horizontal spread associated with a first group of sectors of the supplementary reflector according to one example.

The beam pattern associated with the S0 sectors or facets is shown in FIG. 10B. In FIG. 10B, the maximum intensity is located at a position of −0.1 degrees along the horizontal axis and −0.9 degrees along the vertical axis. The maximum intensity illustrated is 18400 candelas having a total lumen flux of 118. The intensity at the H-V point is 792 candelas.

Figure 10C:
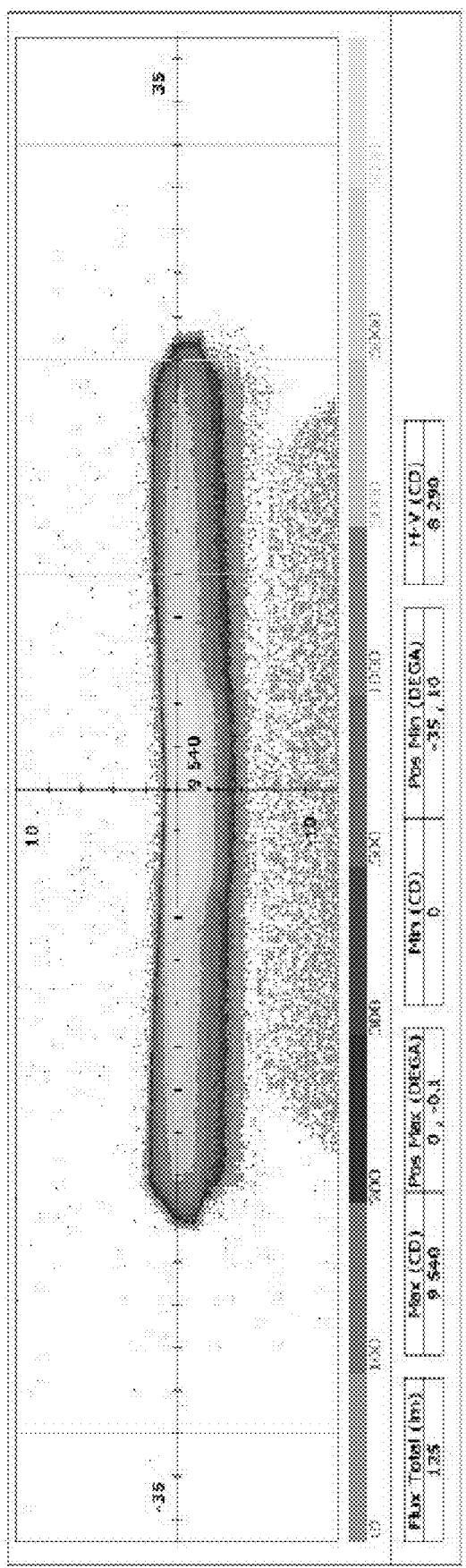
FIG. 10C is a schematic that illustrates the horizontal spread associated with a second group of sectors of the supplementary reflector according to one example.

The beam pattern associated with the S1 sectors is shown in FIG. 10C. In FIG. 10C, the maximum intensity is located at a position of 0 degrees along the horizontal axis and −0.1 degrees along the vertical axis. The maximum intensity illustrated is 9540 candelas having a total lumen flux of 125. The intensity at the H-V point is 8290 candelas.

Figure 10D:
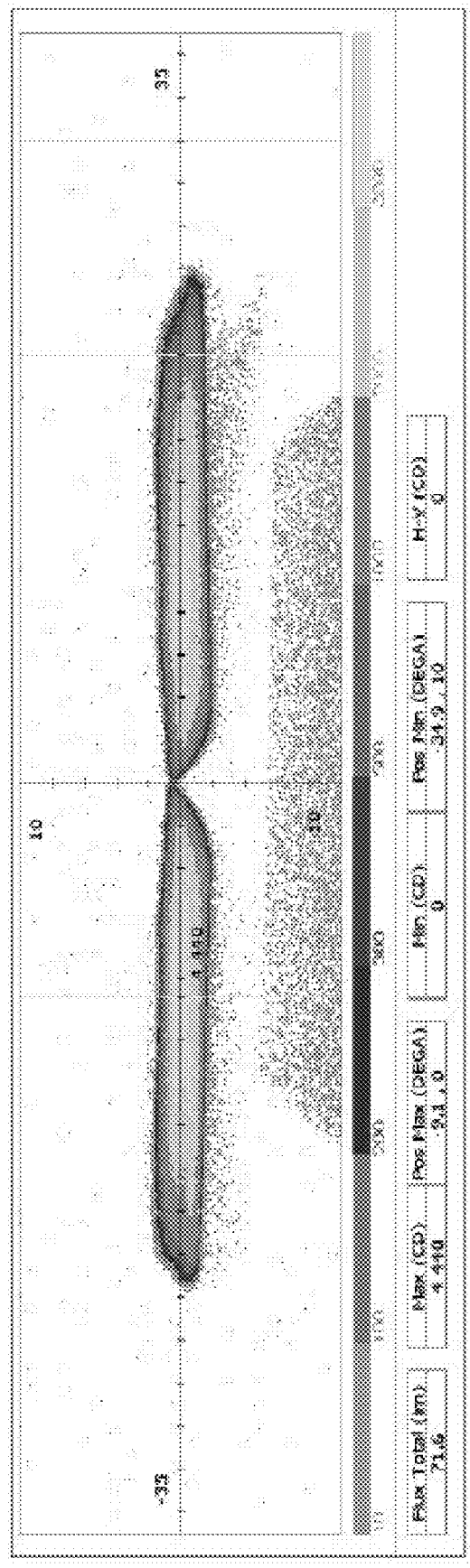
FIG. 10D is a schematic that illustrates the horizontal spread associated with a third group of sectors of the supplementary reflector according to one example.
Figure 10E:
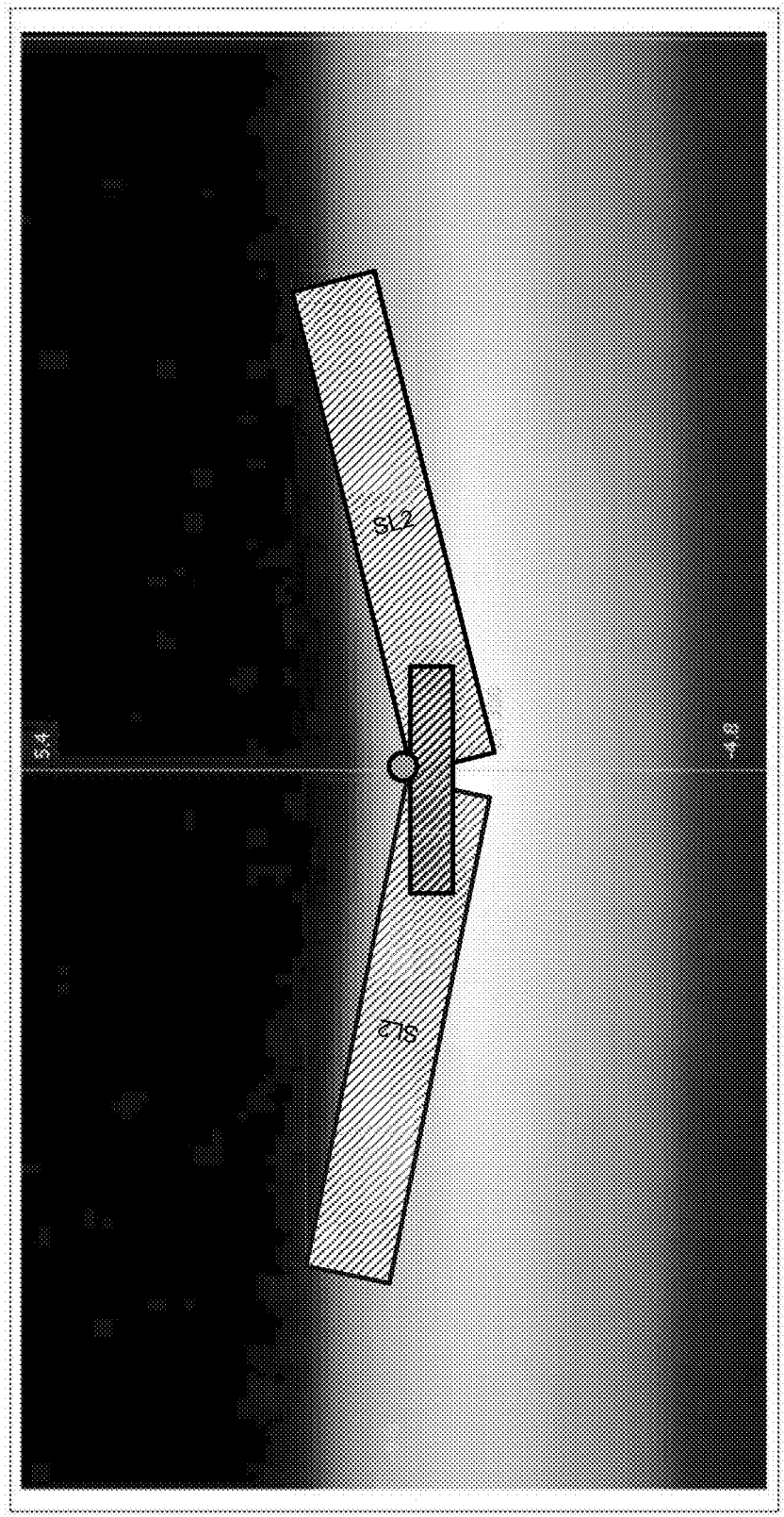
FIG. 10E is a schematic that illustrates an exemplary luminous intensity distribution according to one example.

The beam pattern associated with the S2 sectors is shown in FIG. 10D. In FIG. 10D, the maximum intensity is located at a position of −9.1 degrees along the horizontal axis and −0 degrees along the vertical axis. The maximum intensity illustrated is 4440 candelas having a total lumen flux of 71.6. The intensity at the H-V point is 0.

The surface of the reflector 502 is optimized to control the illumination in various sectors of the beam pattern. The shape of the pattern adds light to the IIHS targets but not too much to the H-V point.

The mathematical surface or profile of the reflector is configured to put the light in different parts of the beam pattern. The mathematical surface depends on the location of the light source and based on the desired horizontal spread. For example for the SR2 sector, the facet starts from 0 degrees right to 8 degrees right. In the example of FIG. 10D, the general range for each region is:

S0a: +/−5° (Horizontal X), 0.0° D to 3° D (Vertical, Y);
S0b: +/−15° (Horizontal X), 0.0° D to 4° D (Vertical, Y);
S1: +/−20° (Horizontal, X), 0.0° D to 4° D (Vertical, Y);
S2R: −20° L to 0° R, 3° U to 3° D (Vertical, Y), with this pattern is tilted 3-7 degrees to form V; and
S2L: 0° L to 20° R, 3° U to 3° D (Vertical, Y), with this pattern is tilted 3-7 degrees to form V.

The tilt/shape of the sectors is also related to the position of the facet in relation to the light source and the shape and type of the light source.

The distribution of the images of the light source in the beam pattern is based on the images of the light source on the facet. For example, very small LED images are good at illuminating along the horizon to form a cutoff. Therefore, the central facets (S0a and S0b) may be used.

SL2 and SR2 are at an angle. The images of the LEDs or light sources are used to create cutoffs to the right and the left. In addition, the aim and spread (up down) is controlled.

In one example, the reflector provides a beam pattern having a V-shape. The V-shape helps in the alignment of the module with respect to the bi-function module 100. Thus, both vertical and horizontal aims are correct relative to the low beam and the high beam of the bi-function module 100. The V-shape is placed around H-V point.

Figure 11A:
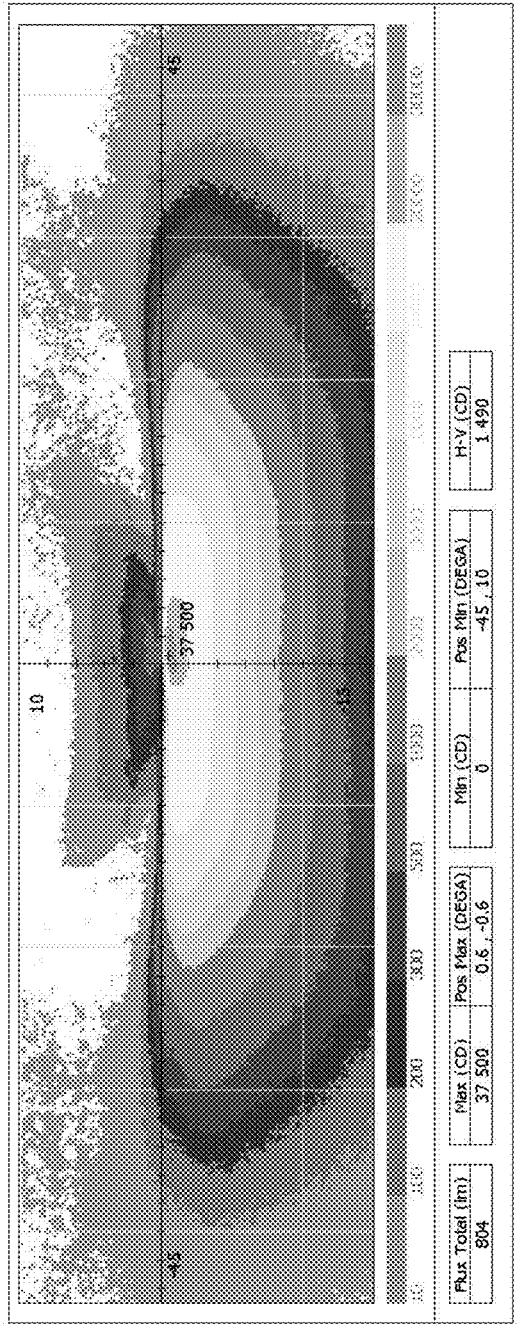
FIG. 11A is a schematic that illustrates an exemplary luminous intensity distribution of a low beam of the bi-function module and the supplementary reflector according to one example.
Figure 11B:
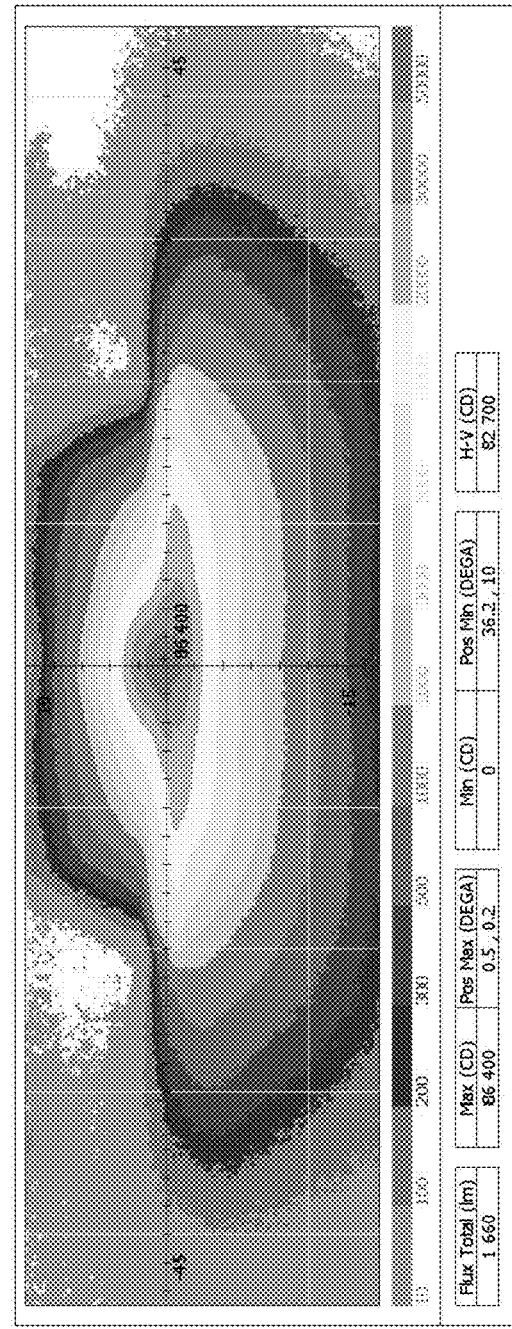
FIG. 11B is a schematic that illustrates an exemplary luminous intensity distribution associated with a high beam of the bi-function module and the supplementary reflector according to one example.
Figures 11C, 11D:
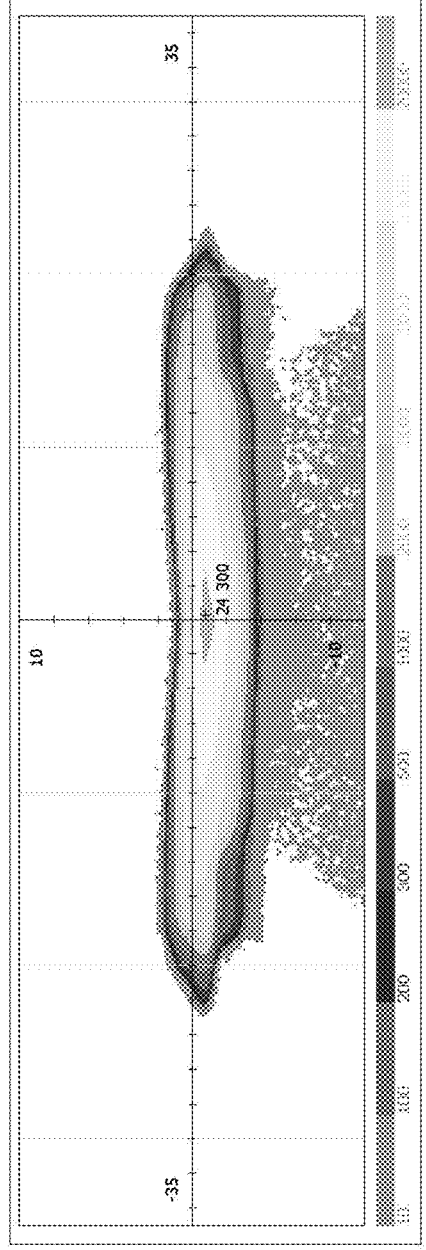
FIG. 11C is a schematic that illustrates an exemplary luminous intensity distribution associated with a beam of the bi-function module and the supplementary reflector according to one example.
FIG. 11D is a schematic that illustrates an exemplary luminous intensity distribution on a screen according to one example.

The luminous intensity distribution associated with the low beam of reflector 502 and the bi-function module 100 is shown in FIG. 11A. The luminous intensity distribution associated with the high beam of reflector 500 and the bi-function module 100 is shown in FIG. 11B. The luminous intensity distribution associated with the reflector 502 having a light source of 600 lumens is shown in FIG. 11C. The gray scale test points are shown in FIG. 11D. The headlamp passes all test points as shown in the table below. The headlamp achieves an IIHS score of 4 demerit, 'Good'

TABLE 1

HB test points

| Name | Hmin | Vmin | RegMin | Value Min | Regmax | Value Max | Value Max + ¼ deg |
|---|---|---|---|---|---|---|---|
| 2U-V | 0 | 2 | 1500 | 40140 | | | |
| 1U-3L | -3 | 1 | 5000 | 32765 | | | |
| 1U-3R | 3 | 1 | 5000 | 34336 | | | |
| HV | 0 | 0 | 40000 | 82749 | 75000 | 82749 | 66388 |
| H-3L | -3 | 0 | 15000 | 45335 | | | |
| H-3R | 3 | 0 | 15000 | 42855 | | | |
| H-6L | -6 | 0 | 5000 | 26284 | | | |
| H-6R | 6 | 0 | 5000 | 25294 | | | |
| H-9L | -9 | 0 | 3000 | 17832 | | | |
| H-9R | 9 | 0 | 3000 | 19261 | | | |
| H-12L | -12 | 0 | 1500 | 12191 | | | |
| H-12R | 12 | 0 | 1500 | 13468 | | | |
| 1.5D-V | 0 | -1.5 | 1500 | 37277 | | | |
| 1.5D-9L | -9 | -1.5 | 2000 | 21213 | | | |
| 1.5D-9R | 9 | -1.5 | 2000 | 21117 | | | |
| 2.5D-V | 0 | -2.5 | 2500 | 20600 | | | |
| 2.5D-12L | -12 | -2.5 | 1000 | 9944 | | | |
| 2.5D-12R | 12 | -2.5 | 1000 | | | | |
| 4D-V | 0 | -4 | | | 12000 | 8297 | |

Figure 12:
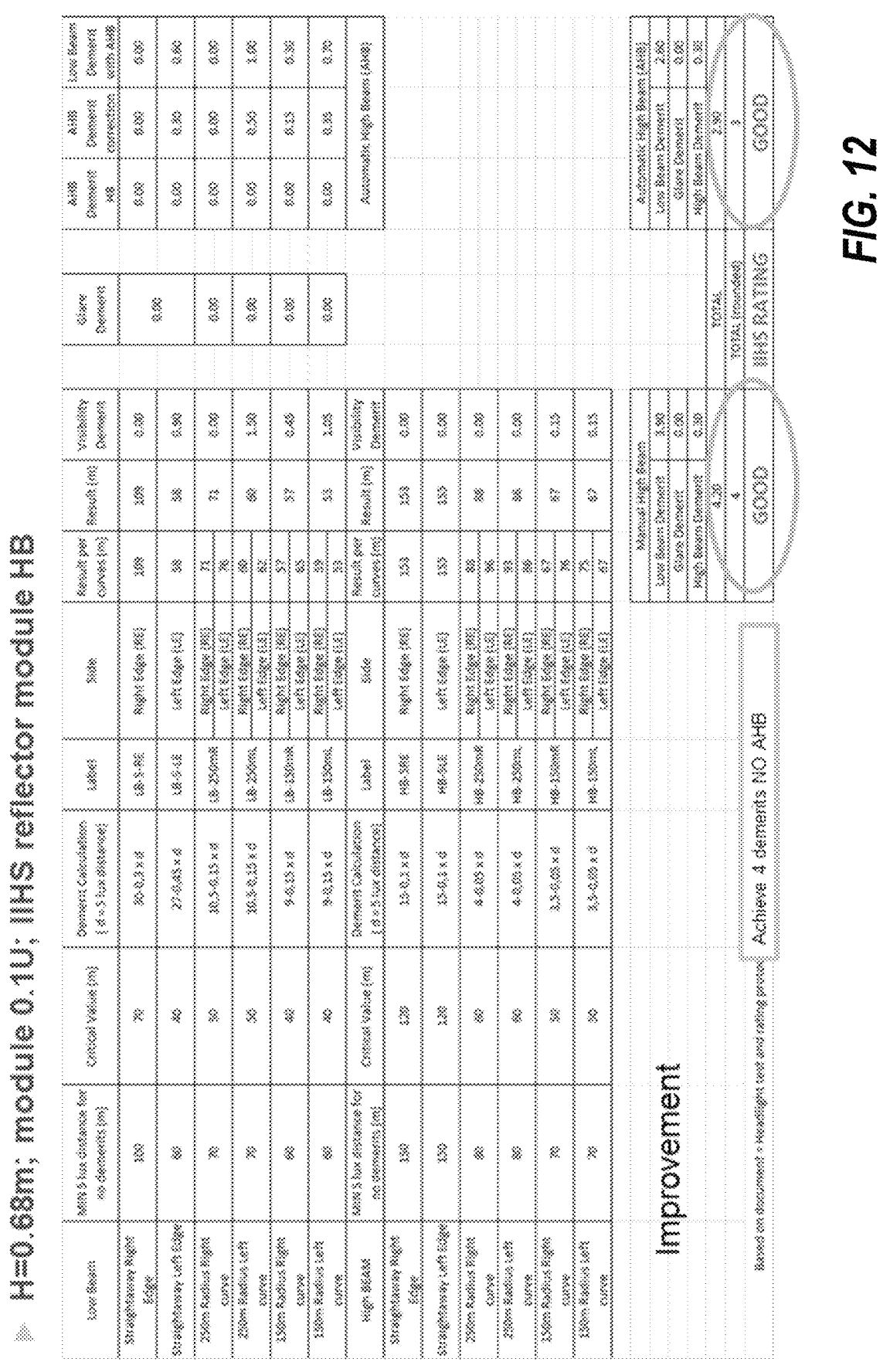

Note that Table 1 is just one example and other designs could have different test point values where the supplemental pattern is added to the primary HB and the combination still passes regulation. Note that the baseline case of FIG. 2 discussed above had a theoretical IIHS score of 8 demerit (NO AHB) and 7 demerit (WITH AHB). If real tolerances are considered the lamp would not have a high probability of achieving 'Good'. As shown in FIG. 11, adding the device improves the IIHS score to 4 demerit (NO AHB) and 3 demerit (WITH AHB). FIG. 12 is an IIHS spreadsheet output showing this improvement.

In FIG. 11A, the maximum intensity is located at a position of 0.6 degrees along the horizontal axis and -0.6 degrees along the vertical axis. The maximum intensity illustrated is 37500 candelas having a total lumen flux of 804. The intensity at the H-V point is 1490 candelas.

In FIG. 11B, the maximum intensity is located at a position of 0.5 degrees along the horizontal axis and 0.2 degrees along the vertical axis. The maximum intensity illustrated is 86400 candelas having a total lumen flux of 1660. The intensity at the H-V point is 82700 candelas.

The headlamp 500 may also include a control circuit for the low beam, high beam, and the supplementary reflector beam. An input signal is connected to the control circuit. The input signal can be a switch to initiate or close power to the bi-function module 100 and supplementary reflector 502. Other types of input signals are contemplated by embodiments described herein, such as a light/dark input signal.

Embodiments described herein include a method of generating a supplementary light beam. The method includes providing a reflector having multiple facets angled with respect to each other. A first luminous intensity distribution is emitted via a first facet of the reflector and a second luminous intensity distribution is emitted via a second facet of the reflector. The first luminous intensity distribution and the second luminous intensity distribution increase illumination at the predefined targets.

Embodiments described herein provide many advantages. Embodiments described herein for the reflector assembly provides increased illumination at the IIHS targets without exceeding legal limits. Further, the reflector described herein allows both vertical and horizontal aim registration of the module.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A reflector of a vehicle headlamp comprising:
a plurality of facets arranged with a center facet forming a deepest portion of the reflector and the remaining facets staggered and extending outward from the center facet angles that form the reflector, wherein each facet of the plurality of facets has a parabolic shape,
wherein each facet is configured to contribute to a section of a beam pattern of light emitted by a light source, wherein the beam pattern produced by the reflector results in a beam having a V-shape, the beam of V-shape set about a predefined point and configured to facilitate an alignment of the beam pattern.

2. A headlamp assembly of automotive lighting comprising:
a light source;
a reflector including a plurality of facets,
said facets arranged with a center facet forming a deepest portion of the reflector and the remaining facets staggered and extending outward from the center facet angles to form the reflector, wherein each facet of the plurality of facets has a parabolic shape,
wherein each facet is configured to contribute to a section of a beam pattern of light from the headlamp assembly, the light emitted by the light source,
wherein the beam pattern produced by the reflector results in a beam having a V-shape, the beam of V-shape set about a predefined point and configured to facilitate alignment of said headlamp assembly.

3. The headlamp assembly of claim 2, wherein the beam of V-shape is configured to aid a horizontal alignment and a vertical alignment of the beam pattern with respect to a bi-function module.

4. The headlamp assembly of claim 2, wherein the beam of V-shape reduces light intensity at a high-beam (HB) of a horizontal-vertical reference position (H-V) to 75000cd maximum value, while adding to a number of Insurance Institute for Highway Safety (IIHS) test points and improving HB performance.

5. The headlamp assembly of claim 2, wherein the beam pattern is optimized to add light to a number of Insurance Institute for Highway Safety (IIHS) visibility targets that improve a number of IIHS score ratings or values.

6. The headlamp assembly of claim 2, wherein the beam of V-shape is located around the predefined point in the beam pattern of a horizontal-vertical reference position (H-V).

7. The headlamp assembly of claim 2, wherein the light source is imaged at a bottom of the beam of V-shape below the predefined point.

8. The headlamp assembly of claim 2, wherein the light source is a module that includes a plurality of light-emitting diode (LED) components.

9. A The headlamp assembly of claim 2, wherein a center facet of the plurality of facets includes a first center facet and a second center facet, the first center facet and the second center facet being angled with respect to each other.

10. The headlamp assembly of claim 9, wherein the center facet of the plurality of sectors is associated with a central section of the luminous intensity distribution.

11. The headlamp assembly of claim 10, wherein the center facet of the plurality of sectors is configured to form a horizontal cut-off to aid in vertical alignment.

12. The headlamp assembly of claim 9, wherein the light source is positioned proximate to the center facet.

13. The headlamp assembly of claim 2, further comprising:
a bi-function module configured to generate a high beam and a low beam, wherein the beam pattern from the reflector is superimposed with the high beam.

14. The headlamp assembly of claim 2, wherein the reflector includes at least 5 vertical sectors with a center sector having 2 zones.

15. The headlamp assembly of claim 14, wherein a first facet and a second facet contributes to mirror sections of the beam pattern and a third facet and a fourth facet contributes to another mirror sections of the beam pattern.

16. The headlamp assembly of claim 2, wherein each facet of the plurality of facets that are angled with respect to each other forms a side of the V-shape, and is configured to aid in horizontal alignment and keeps light from a horizontal-vertical reference position (H-V).

17. The headlamp assembly of claim 2, wherein a profile of the reflector is a function of locations of predetermined target points.

18. The headlamp assembly of claim 14, wherein the profile of the reflector is configured to increase illumination at the predetermined target points.

19. A method of generating a supplementary light beam, the method comprising:
emitting a first luminous intensity distribution via a first facet of a reflector including a plurality of facets that are arranged with a center facet forming a deepest portion of the reflector and with the remaining facets staggered and extending outward from the center facet that form the reflector, wherein each facet of the plurality of facets has a parabolic shape; and
emitting a second luminous intensity distribution via a second facet of the reflector, wherein the first luminous intensity distribution and the second luminous intensity distribution increase illumination at predefined target points; and
wherein said light beam pattern produced by the reflector results in a beam having a V-shape, the beam of V-shape configured to facilitate alignment and reduce an added intensity at a horizontal-vertical reference position (H-V) of said supplementary light beam.

* * * * *